United States Patent
Wang et al.

(10) Patent No.: US 7,689,068 B1
(45) Date of Patent: Mar. 30, 2010

(54) ONE-WAY WAVEGUIDES USING GYROTROPIC PHOTONIC CRYSTALS

(75) Inventors: Zheng Wang, Cambridge, MA (US); Yidong Chong, Cambridge, MA (US); John D. Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/329,853

(22) Filed: Dec. 8, 2008

(51) Int. Cl.
   *G02F 1/295* (2006.01)
   *G02B 6/12* (2006.01)
(52) U.S. Cl. .......................... 385/6; 385/129
(58) Field of Classification Search .............. 385/6, 385/129
   See application file for complete search history.

(56) References Cited

U.S. PATENT DOCUMENTS

| 4,489,240 A | 12/1984 | Kronenberg et al. |
| 4,712,855 A | 12/1987 | Tolksdorf et al. |
| 4,973,119 A | 11/1990 | Taki |
| 6,262,949 B1 | 7/2001 | Inoue et al. |
| 6,545,795 B2 | 4/2003 | Matsushita et al. |
| 6,701,048 B2 | 3/2004 | Figotin et al. |
| 6,952,300 B2 | 10/2005 | Levy |
| 7,164,823 B2 | 1/2007 | Lee et al. |
| 2002/0154403 A1 | 10/2002 | Trotter |
| 2008/0267557 A1 | 10/2008 | Wang et al. |

OTHER PUBLICATIONS

Takeda et al, "Compact optical one-way waveguide isolators for photonic-band-gap microchips" Physical Review A 78 (2008), pp. 023804-1-023804-15.
Princeton University Press, Nov. 13, 2007, Chapter 5, pp. 66-76 & 89-92.
Raghu et al., "Analogs of quantum Hall effect edge states in photonic crystals" ArXiv: cond-mat/0602501 v 3, Apr. 18, 2006, pp. 1-23.
Haldane et al.,"Possible Realization of Directional Optical Waveguides in Photonic Crystals with Broken Time-Reversal Symmetry" Physical Review Letters, Jan. 11, 2008, pp. 013904-1-013904-4.
Waldron et al., "What is ferromagnetic resonance?" British Journal of Applied Physics, vol. 11, Feb. 1960, pp. 69-73.

*Primary Examiner*—Jerry T Rahll
(74) *Attorney, Agent, or Firm*—Gauthier & Connors LLP

(57) ABSTRACT

A waveguide structure is provided. The waveguide structure includes a photonic crystal structure comprising gyromagnetic materials arranged in a two-dimensional lattice formation that exhibits a plurality of one-way modes produced as a result of magneto-optic effects. One or more confining barriers are positioned around the photonic crystal structure so as to allow the one-way modes to propagate through the photonic crystal structure. One or more radiation sources are positioned in or around the photonic crystal structure so as to couple electromagnetic energy into and out of the waveguide. One or more static external magnetic field sources induce the magneto-optic effects such that the one-way modes are allowed to propagate in one direction in the photonic crystal structure.

24 Claims, 6 Drawing Sheets

ONE-WAY WAVEGUIDES USING GYROTROPIC PHOTONIC CRYSTALS

This invention was made with government support awarded by the Army Research Office under Grant No. W911NF-07-D-0004 and the National Science Foundation under Grant No. DMR-02-13282. The government has certain rights in the invention.

BACKGROUND OF THE INVENTION

The invention is related to the field of waveguides, and in particular to a quasi-two-dimensional gyrotropic photonic crystal used as a one-way microwave waveguide.

Photonic crystals are structures that are specifically engineered to have periodicity comparable to the wavelength of light. Such devices, which were invented in the late 1980s, possess many interesting optical properties. Their underlying theoretical description relies on an analogy between (i) the equations of classical electromagnetism in a periodic medium, and (ii) the equations of quantum mechanics in a periodic potential. The latter is most commonly used to describe the physics of electrons in a crystalline solid, which has long been a basic part of "condensed-matter" (or "solid-state") physics. Many phenomena that occur in condensed-matter systems have been observed in photonic crystal systems.

The unique physical phenomena that occur in both photonic crystals and electrons in crystalline solids are referred as "band effects". The electromagnetic modes in a photonic crystal fall into "bands"—discrete ranges of energy and frequency—similar to the electronic bands that occur in a solid. Between the bands lie "band gaps", ranges of energy and frequency in which no propagating modes exist. Note, however, that despite the strong theoretical analogies between photonic crystal modes and electron states, their underlying physical natures are quite different: the former are propagating disturbances in the electromagnetic field, while the latter are quantum mechanical states of matter.

The length-scale of a photonic crystal determines the range of frequencies at which band effects occur. To observe band effects at the frequency of visible light, a photonic crystal must have a crystalline lattice spacing of around 0.5 micrometers. In the present patent, for reasons that will be described below, we will mostly be concerned with band effects that occur at microwave frequencies. These are produced in photonic crystals with lattice spacings of about a centimeter.

SUMMARY OF THE INVENTION

According to one aspect of the invention, there is provided a waveguide structure. The waveguide structure includes a photonic crystal structure comprising gyromagnetic materials arranged in a lattice formation that exhibits a plurality of one-way modes produced as a result of magneto-optic effects. One or more confining barrier is positioned around the photonic crystal structure so as to allow the one-way edge modes to propagate through the photonic crystal structure. One or more radiation sources are positioned in or around the photonic crystal structure so as to couple electromagnetic energy into and out of the waveguide. One or more magnets produce a static external magnetic field that induces the magneto-optic effects such that the one-way modes are allowed to propagate in one direction in the photonic crystal structure.

According to another aspect of the invention, there is provided a method of forming a waveguide structure. The method includes providing a photonic crystal structure comprising gyromagnetic materials arranged in a lattice formation that exhibits a plurality of one-way edge modes produced as a result of magneto-optic effects. Also, the method includes positioning one or more confining barriers around the photonic crystal structure so as to allow the one-way modes to propagate through the photonic crystal structure. Also, the method includes positioning one or more radiation sources in or around the photonic crystal structure so as to couple electromagnetic energy into and out of the waveguide. Furthermore, the method includes providing one or more magnets produce a static external magnetic field that induces the magneto-optic effects such that the one-way modes are allowed to propagate in one direction in the photonic crystal structure.

DETAILED DESCRIPTION OF THE INVENTION

Figure 1B:
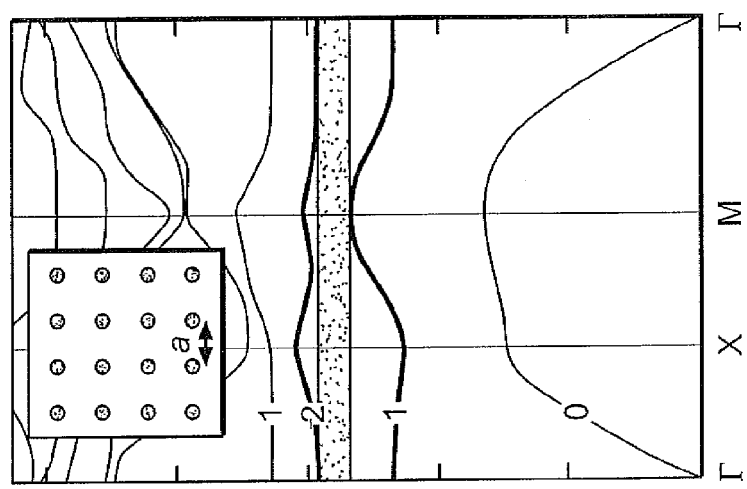
FIGS. 1A-1B is a TM photonic band structure for a square lattice of YIG rods in air with zero static magnetic field and 1600 Gauss +z static magnetic field.

The invention involves a quasi-two-dimensional gyrotropic photonic crystal that can be used as a one-way microwave waveguide. Such a waveguide transmits microwave-frequency electromagnetic radiation in only one direction, with reverse propagation strongly suppressed.

It was argued that some two-dimensional photonic crystals can exhibit "one-way edge modes", i.e., electromagnetic modes that are confined to the edge of the crystal and propagate in only one direction along that edge. Because there are no modes with the opposite group velocity, propagation in the reverse direction is forbidden (to be precise, those modes are evanescent). Thus, back-scattering is strongly suppressed.

One-way electromagnetic edge modes occur only if some underlying material within the photonic crystal exhibits a phenomenon known as a "magneto-optic effect". Such materials are "gyrotropic": applying a static external magnetic field causes them to interact with harmonic electromagnetic fields in an asymmetric or "chiral" manner. There are several different physical mechanisms by which this can occur, and the specific magneto-optic effect that the invention uses, called ferromagnetic resonance.

Assuming that the structure of the crystal is correctly chosen, the magneto-optic effect induces "topological changes" in some photonic bands. This in turn implies the existence of one-way edge modes. This result relies on a principle that is well-known in the literature of condensed-matter physics, and can be deduced by direct analogy with a condensed-matter system known as the integer quantum Hall system. There, the application of a magnetic field induces similar topological changes in the electron band structure, which leads to electron states that propagate in one direction. These "one-way electron edge states" are analogous to the one-way electromagnetic edge modes that one wishes to generate.

If the one-way edge modes lie in a band gap, the boundary of the photonic crystal forms a one-way electromagnetic waveguide. Unlike ordinary waveguides, transmission along this one-way waveguide is strongly "non-reciprocal": at the operating frequency, electromagnetic waves can only propagate in one direction along the waveguide, and propagation in the reverse direction is evanescent. Furthermore, the transmission is unaffected by arbitrary variations in the shape of the waveguide. This is because the existence of the one-way modes is tied to a topological property of the photonic bands and does not depend on details of the photonic crystal edge.

The prior art has not specify a physically realistic mechanism for inducing practically observable one-way modes. In particular, the focus was on triangular-lattice photonic crystals, and showed that one-way edge modes can occur in the TE spectrum. TE stands for transverse-electric, i.e. magnetic fields pointing parallel to the normal axis of the plane of the two-dimensional crystal. Such systems rely on a "gyroelectric" magneto-optic effect, in which the applied magnetic field induces an imaginary off-diagonal component in the material's permittivity tensor. The prior art also specifically demand a linear degeneracy at the zone boundary of the photonic crystal lattice, thereby limiting the lattice structure to photonic crystals with 3-fold rotational symmetry. In contrast, the invention specifically operates at a quadratic denegeracy, far more common in photonic crystal lattices.

The difficulty with the TE scheme in the prior art is that such gyroelectric effects are extremely weak. Quantitatively, the ratio of (imaginary) off-diagonal to (real) on-diagonal elements of the permittivity tensor is at most one-tenth of one percent. This poses a grave practical difficulty, because it means that the band gap is not robust against disorder. Thus, the one-way edge modes scatter easily into bulk modes of the crystal, causing significant radiative loss. So significant are these losses that it is unlikely that the one-way edge modes in such a system can even be observed.

Another difficulty is the difficulty to create three-dimensional systems whose electromagnetic modes are similar to the TE modes found in hypothetical two-dimensional systems.

Here, the invention describes a technique to generate practical one-way modes using a quasi-two-dimensional magneto-optic photonic crystal. This relies on the following principles: (i) Use a material or meta-material in which the strength of magneto-optic effect is resonantly enhanced. (ii) Design a two-dimensional photonic band structure that exhibits one-way modes as a result of the magneto-optic effect. In the present case, these modes occur in the TM spectrum (TM stands for transverse-magnetic, for example, electric fields pointing parallel to the normal axis of the plane), and arise from a "quadratic band degeneracy" between the second and third TM bands. (iii) Use a "quasi-two-dimensional" device to realize the two-dimensional TM electromagnetic modes.

Specifically, one can employ a material that exhibits ferromagnetic resonance, in which a resonant magneto-optic effect occurs at microwave frequencies. Unlike other magneto-optic effects, ferromagnetic resonance affects the TM band structure rather than the TE band structure. The materials are shaped into rods and arranged in a centimeter-scale square lattice, surrounded by a low-index material such as air, to form a photonic crystal with band effects at microwave frequencies. This gives rise to one-way modes within the second band gap of the TM band structure.

The one-way modes are then realized using a quasi-two-dimensional physical device in which the crystal is sandwiched between two conducting plates, which reproduces the two-dimensional TM modes. Note that there are other possible techniques for implementing quasi-two-dimensional systems, which have equivalent effects; for instance, one could use a three-dimensional photonic crystal in which the required line defects are all implemented in a multi-plane photonic crystal.

Materials such as Yttrium-Iron-Garnet—collectively known as "ferrites"—exhibit a phenomenon known as ferromagnetic resonance. In the presence of an applied magnetic field –B, the material permeability for harmonic electromagnetic fields of angular frequency $\omega$ is $$\mu = \mu_0 + \begin{bmatrix} \delta\mu & i\kappa & 0 \\ -i\kappa & \delta\mu & 0 \\ 0 & 0 & 0 \end{bmatrix} \qquad \text{EQ. 1}$$

$$\delta\mu = \mu_0 \left( \frac{\omega_0 \omega_m}{\omega_0^2 - \omega_m^2} \right) \qquad \text{EQ. 2}$$

where $\mu 0$ is the permeability of free space, and $$\kappa = \mu_0 \left( \frac{\omega \omega_m}{\omega_0^2 - \omega_m^2} \right) \qquad \text{EQ. 3}$$

Here, $\omega 0 = \mu 0 \gamma H 0$, where $\gamma$ is the gyromagnetic ratio of the electron and $H 0$ is the applied external magnetic field; and $\omega m = \mu 0 \gamma M_s$, where $M_s$ is the saturation magnetization of the ferrite. As can be seen, the permeability tensor possesses an imaginary off-diagonal component when $H 0$ is non-zero. This is a kind of magneto-optic effect.

This phenomenon has an additional useful property: it is resonant. Let us call $\omega 0$ the "frequency of ferromagnetic resonance". When the operating frequency $\omega$ is close to this frequency, the second term in (1) dominates the permeability, and the magneto-optic effect is extremely strong—much stronger than in gyroelectric materials.

The frequency of ferromagnetic resonance is determined by the applied magnetic field $H 0$. Practical magnetic field strengths of around 0.1T correspond to operating frequencies in the gigahertz (microwave) regime. This is the parameter regime that is will be studied in the remainder of this document. If stronger magnetic fields are applied, the operating frequencies can be increased; the basic results described below will still apply.

The ferromagnetic resonance described in the previous section affects the TM modes, because the magneto-optic effect occurs the permeability tensor. If it occurs in the permittivity tensor, it would affect only the TE modes.

Figure 1A:
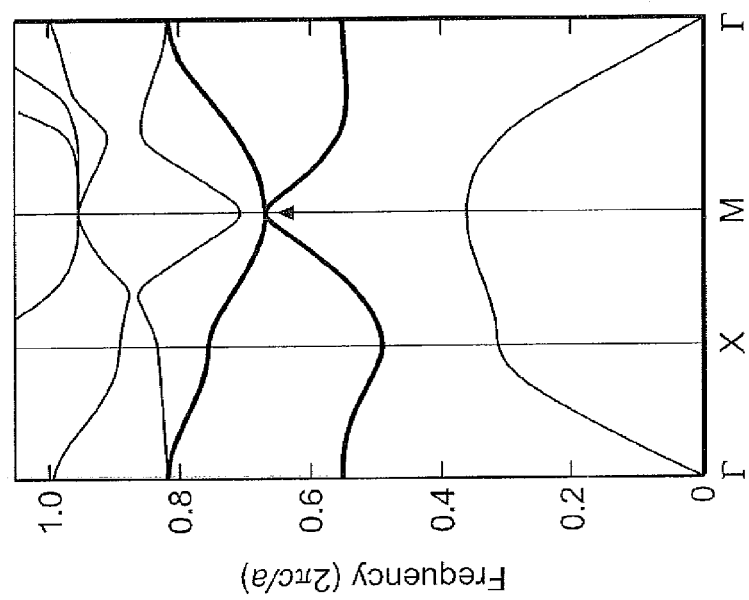

FIG. 1A shows the TM band structure for a photonic crystal with ferrite rods (with permittivity $\epsilon = 15\ \epsilon 0$) arranged in a square lattice of radius 0.11a. where a is the lattice constant, and surrounded by air. When no static out-of-plane magnetic field is applied, the second and third TM bands are quadratically degenerate at the corner of the Brillouin zone (M). Applying a static out-of-plane magnetic field induces a magneto-optic band gap between the second and third TM bands. One can call the frequency at which this band gap occurs the "operating frequency".

The magneto-optic band gap is large if the system is designed such that the frequency of ferromagnetic resonance lies near the operating frequency. For instance, in FIG. 1B, it is assume a static 1600 Gauss out-of-plane magnetic field; at 4.28 gigahertz, the permeability components for a typical ferrite are $\delta\mu=13\ \mu0$ and $\kappa=12.4\ \mu0$. The approximate band structure, shown in FIG. 1B, exhibits a broad (10%) band gap.

Theoretical considerations tell us that one-way modes exist within the frequency range spanned by this bandgap. These one-way modes exist at the physical edge of the photonic crystal. It is necessary that there are no bulk electromagnetic modes on the other side of the edge (the "confining barrier"), outside the photonic crystal; otherwise, the one-way modes would simply leak out and be lost. This can be accomplished by using an ordinary photonic crystal with a band gap at the operating frequency as the confining barrier, or by using a good electric conductor as the confining barrier.

Figure 2A:
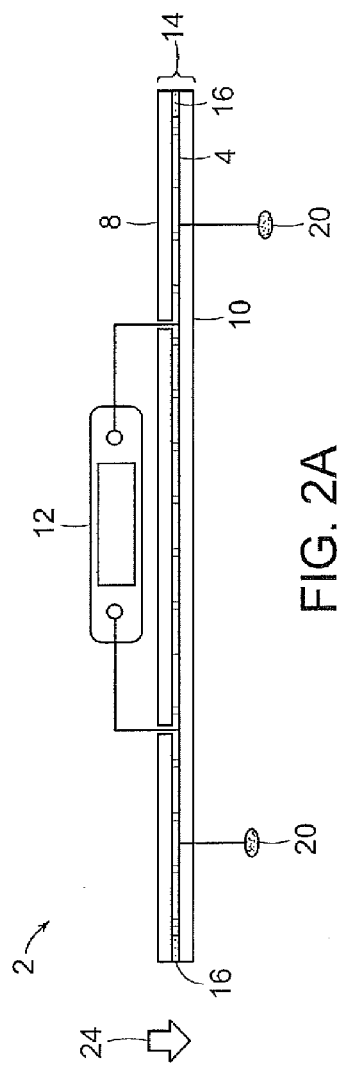
FIGS. 2A-2B are schematic diagrams illustrating cross sectional and planar quasi-two-dimensional views of the inventive gyrotropic photonic crystal structure used in accordance with the invention.
Figure 2B:
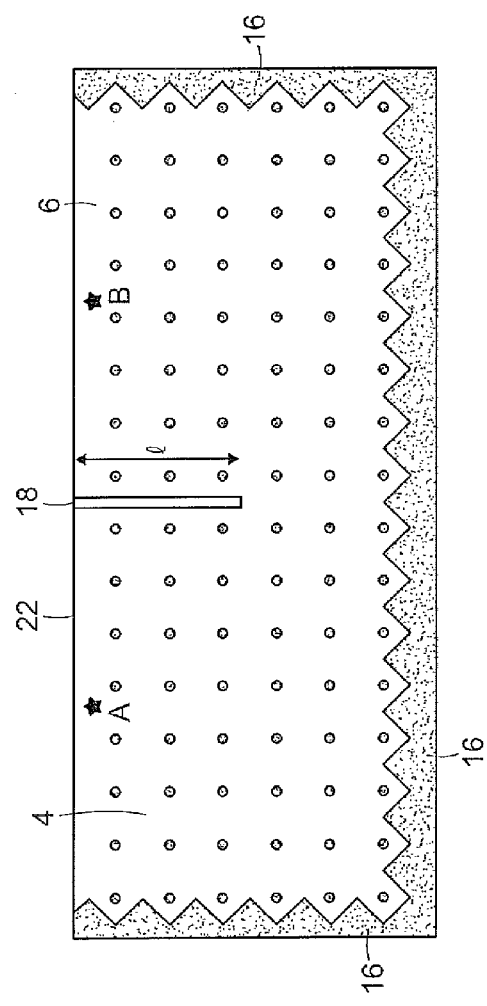

A schematic diagram of the inventive structure is shown in FIGS. 2A-2B, where FIG. 2A is a cross-sectional view and FIG. 2B is a planar view of the inventive structure 2. The main part of the inventive one-way edge mode waveguide structure 2 is a photonic crystal 4 comprising gyro-magnetic materials, such as ferrite rods with a 3 mm radius, arranged in a 2-D lattice formation, such as a square lattice 6 with 40 mm spacing, and sandwiched between two rigid copper plates 8, 10 in order to confine the electromagnetic field in the out-of-plane directions. The gyro-magnetic materials can be resonantly enhanced by a metamaterial to provide a strong gyromagnetic response at a frequency far from the ferromagnetic resonance. The square lattice arrangement supports quadratic degeneracy at the zone boundary of its band diagram. In other embodiments of the invention, the photonic crystal 4 can be comprised of other lattice arrangements supporting quadratic degeneracy at the zone boundary of its band diagram. The separation between the plates 8, 10 is small (5 mm) relative to the lattice spacing, so the electromagnetic fields at the operating frequencies are strictly TEM and are equivalent to two-dimensional TM polarizations. In the absence of an external magnetic field, the degeneracy between the second and third TM bands occurs at around 4.5 GHz.

Two antennae, labeled A and B, couple electromagnetic or radiative energy in and out of the one-way edge mode waveguide structure 2. These are attached to coaxial connectors in the upper plate 8, and hence to an external device such as a two-port microwave network analyzer 12. The two antennae 8, 10 lie near an edge of the photonic crystal 4, formed by a confining barrier 14 joining the upper 8 and lower 10 plates providing the out-of-plane confinement and a barrier 22 providing the in-plane confinement. Both confining barriers 14 and 22 can include either one or more photonic crystal structures or other types of conducting plates. Also, both confining barriers 14 and 22 support no propagating bulk modes or propagating surface modes at the operating frequencies of the one-way waveguide. The remaining edges of the YIG photonic crystal 4, further from the antennae A, B, are lined with microwave absorbing foam 16 at ends of the photonic crystal 4 and confining barriers 14 and 22.

Power is transmitted from antenna A to B despite the presence of a large conducting scatterer 18 between antennae A and B. The radiation flows around the scatterer 18 without incurring radiative losses. One or more static external magnetic field sources 20, such as magnets, induce the magneto-optic effects such that the one-way edge modes are allowed to propagate in one direction in the photonic crystal 4. The major component of static magnetic field from the source 20 is along the out-of-plane direction 24, which is perpendicular to the plane of the 2D crystal lattice.

On applying a static, uniform magnetic bias to the system, one is able to use it as a one-way waveguide with antennae A and B as the waveguide ports, as shown in FIG. 2. The transmission is strongly non-reciprocal, because radiation can only flow in one direction, either A to B or from B to A, depending on the direction of the applied magnetic field. The electromagnetic fields can be visualized using the computer simulation results shown in FIGS. 3A-3B.

Figure 3A:
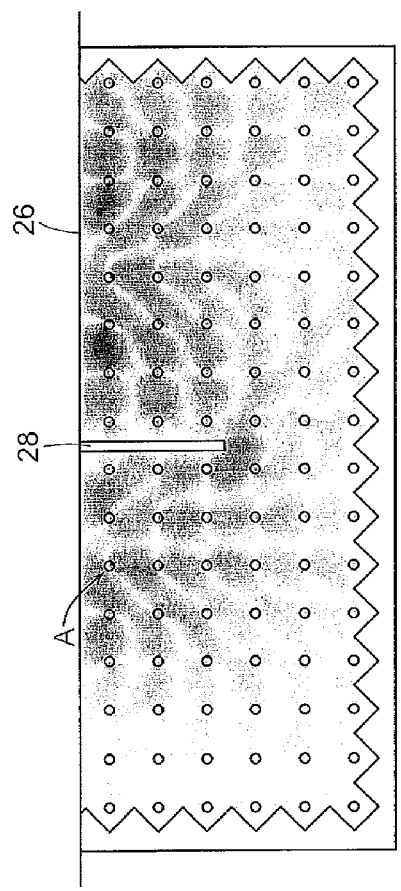
FIGS. 3A-3B are electric-field plots illustrating electromagnetic field transmission along the inventive one-way waveguide being unaffected by the shape of the waveguide.
Figure 3B:
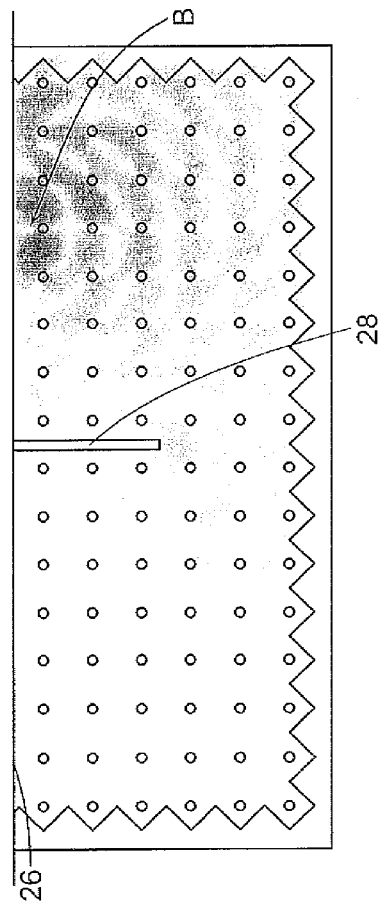

FIG. 3A is a plot of the electric field E at a given instant, with power input at antenna A, from a computer simulation using the finite-element technique. Here, Ez>0 and Ez<0 are shown. The emitted radiation moves to the right along the confining barrier 26, circumventing the scatterer 28. FIG. 3B is a plot of Ez at a given instant, with power input at antenna B.

From FIGS. 3A-3B, one can also see that transmission along the one-way waveguide is essentially unaffected by the shape of the waveguide. Here, power is transmitted from A to B despite the presence of the large conducting scatterer 28 between A and B: the radiation flows around the scatterer 28 without incurring radiative losses. This is another unique feature of the inventive one-way waveguide.

Figure 4A:
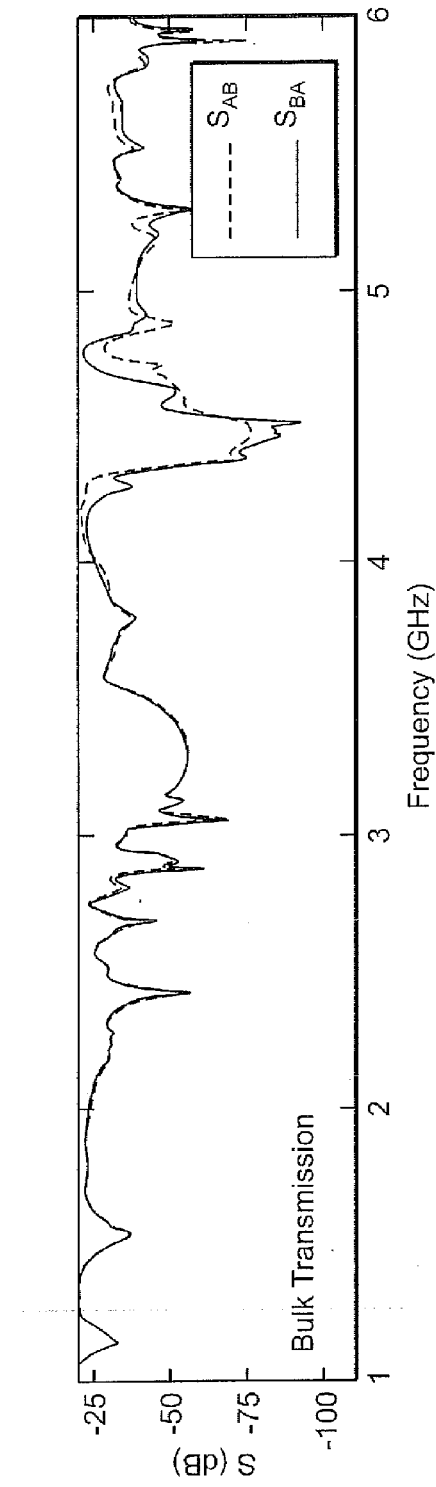
FIGS. 4A-4B are graphs illustrating the transmission coefficients between the two antennae used in accordance with the invention.
Figure 4B:
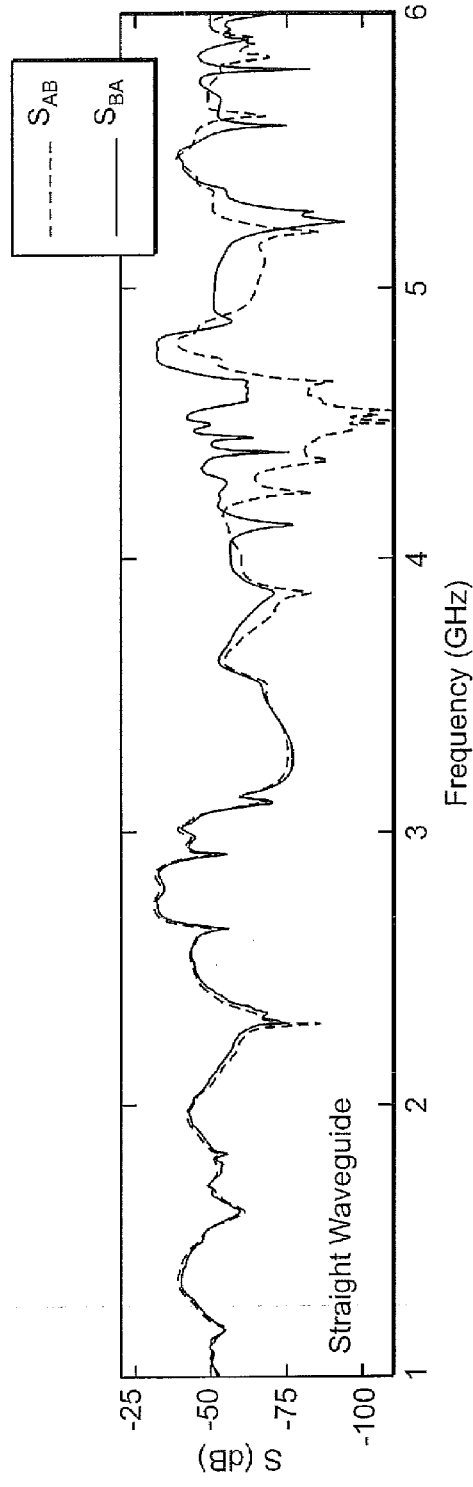
Figure 5B:
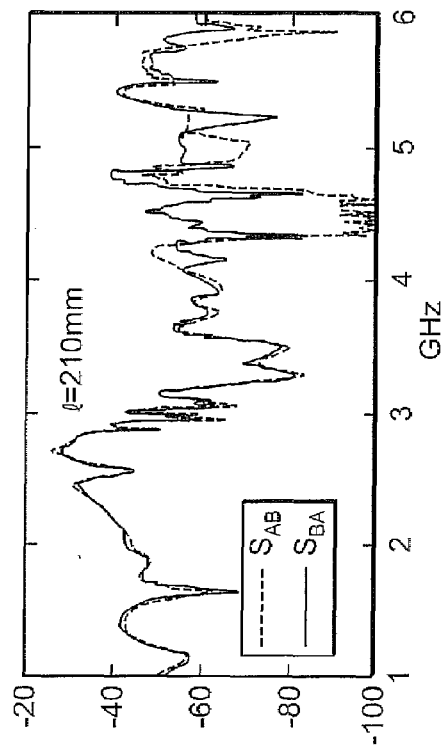
FIGS. 5A-5F are graphs illustrating the transmission at different values of l, where l is the length of a conducting scatterer between antennae A and B.
Figure 5D:
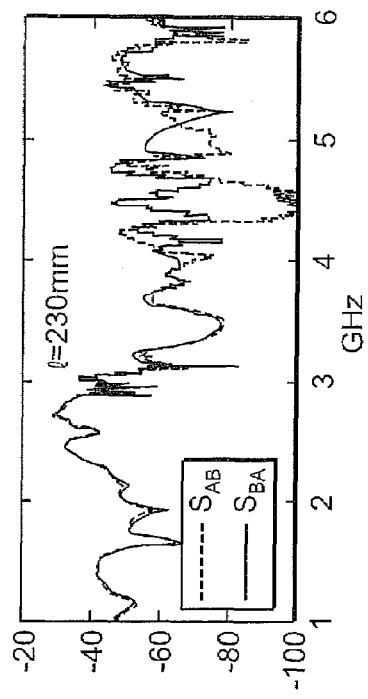
Figure 5A:
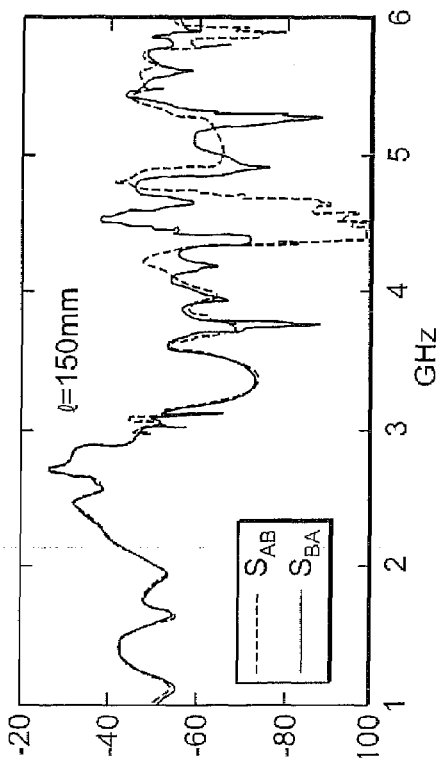
Figure 5C:
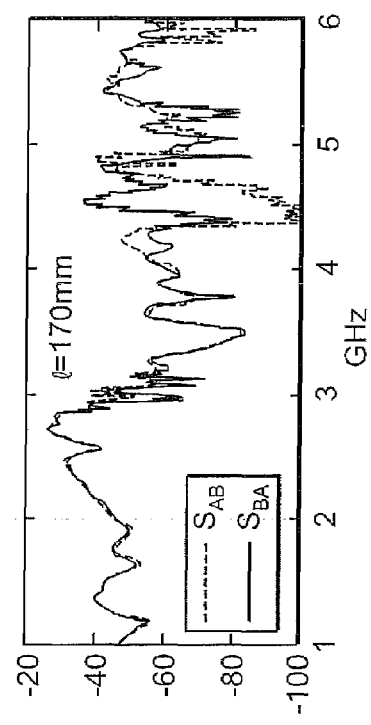
Figure 5E:
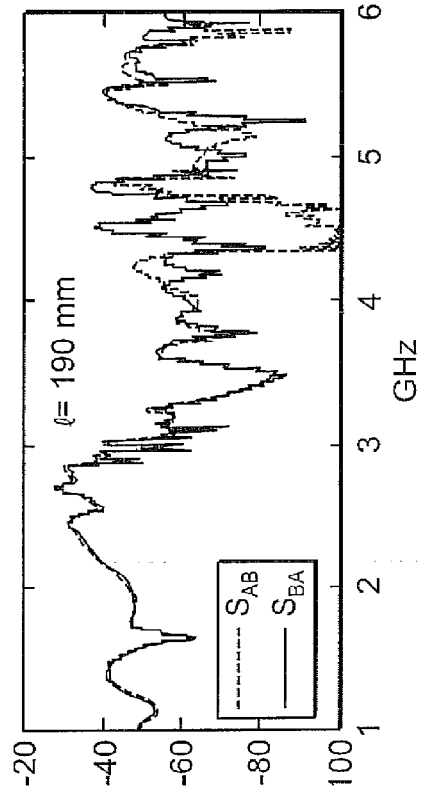
Figure 5F:
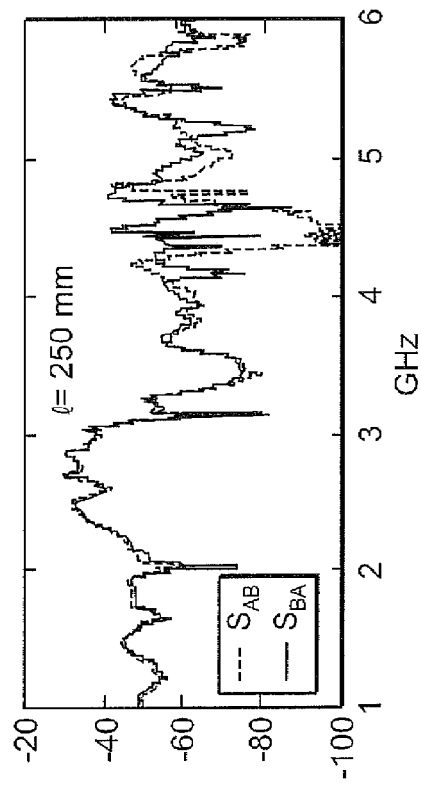

In FIGS. 4A-4B, the transmission coefficients between the two antennae, labeled $S_{AB}$ for transmission from B to A, and $S_{BA}$ for transmission from A to B, in an actual experiment performed on the apparatus is shown.

In FIG. 4A, antennae A and B are located in the middle of a 16×10 crystal, with absorbing foam lining all four edges. The transmission indicates photonic bandgaps at 3.3 GHz and 4.5 GHz. In FIG. 4B, A and B are located along a conducting edge of a 16×6 crystal, as shown in FIG. 2A. At 4.5 GHz, the frequency of the magnetic bandgap, $S_{BA}$ exceeds $S_{AB}$ by about 50 dB. This signals the existence of a one-way edge mode. This confirms the strongly non-reciprocal nature of the transmission along the waveguide.

FIGS. 5A-5F are transmission plots at different values of l, where l is the length of a conducting scatterer between antennae A and B. The other experimental parameters are the same as in the lower plot of FIG. 4. At 4.5 GHz, $S_{AB} \ll S_{BA}$ regardless of the value of l, which shows that the one-way edge modes can travel around the barrier without scattering.

In FIGS. 5A-5F, the experimental transmission coefficients in the presence of a scatterer are shown; as expected, the barrier does not affect the overall transmission and the strong non-reciprocity of the waveguide.

A low-loss, strongly non-reciprocal optical device is described. The only significant source of dissipation in the device is the intrinsic material loss in the ferrite elements. The attenuation length is several thousand lattice constants, which is negligible for most application purposes; by contrast, the edge modes die off in the reverse direction with an evanescent decay length of about a lattice constant. One other possible source of dissipation is the radiation loss that may occur if the photonic crystal cladding is thinner than the width of the guided one-way modes. However, arbitrarily low levels of radiation can be achieved by increasing the physical dimensions of the photonic crystal.

Because the one-way edge modes are robust against disorder, the design is tolerant to small errors incurred during fabrication, such as variations in the lattice constant or the position of the guiding edge. Another important feature of this device is that the biasing magnetic field is applied normal to the plane, and not parallel to the direction of signal propagation; this is convenient for applications to planar (chip-like) geometries.

A one-way edge mode waveguide is particularly useful in integrated photonics and microwave circuits, since the propagation of the mode is completely unaffected with sharp bends and imperfections. The elimination of backscattering allows great flexibility in designing optical or microwave circuits at high device densities, without the concern of insertion loss caused by tight routing of waveguides.

One possible application of this device is as an optical isolator in an integrated optical circuit. Such circuits require a mechanism for preventing optical signals from reflecting back along the desired path. In particular, backscattered signals can interact badly with nonlinear or active optical elements. The development of large-scale integrated optical circuits has been impeded by the absence of effective optical isolators. For instance, the most common isolating device, a Faraday isolator, has several notable disadvantages: it operates by selectively filtering out one polarization channel (leading to a large intrinsic signal loss), and the biasing magnetic field must be applied parallel to the direction of signal propagation.

The invention can also be applied to any optical application in which the group velocity of light is slowed down. Slow-light devices are often plagued by the presence of strong backscattering, which increases as the group velocity decreases. One can overcome this problem using a one-way edge mode waveguide with slow one-way edge modes. Despite their low group velocity, these modes exhibit negligible backscattering because the backscattered modes are evanescent. For instance, such devices might serve as optical buffers in quantum networks, in which a slow quantum electromagnetic mode (an "optical qubit") must be stored for a period of time without experiencing quantum decoherence.

The invention operates at microwave frequencies, but this operating frequency can be increased to the terahertz regime and higher by applying a stronger magnetic field and decreasing the lattice constant of the photonic crystal. Another option for achieving higher operating frequencies is to use metamaterial structures to enhance the magneto-optic effect of the active material. For instance, by embedding the active material (a ferrite or other gyromagnetic material) with capacitive loops, one can obtain a strong magneto-optic effect near the resonant frequency of the loops, which may be much higher than the ferromagnetic resonance frequency of the underlying material. The device may then be designed with a photonic crystal lattice constant suitable for operating at this higher frequency, with equivalent functionality.

Although the present invention has been shown and described with respect to several preferred embodiments thereof, various changes, omissions and additions to the form and detail thereof, may be made therein, without departing from the spirit and scope of the invention.

What is claimed is:

1. A waveguide structure comprising:
    a photonic crystal structure comprising gyromagnetic materials arranged in a two-dimensional lattice formation that exhibits a plurality of one-way edge modes produced as a result of magneto-optic effects;
    one or more confining barriers positioned around said photonic crystal structure so as to allow said one-way edge modes to propagate through said photonic crystal structure;
    one or more radiation sources positioned in or around said photonic crystal structure so as to couple electromagnetic energy into and out of the waveguide; and
    one or more static external magnetic field sources that induce said magneto-optic effects such that said one-way edge modes are allowed to propagate in one direction in said photonic crystal structure.

2. The waveguide structure of claim 1, wherein said photonic crystal structure comprises a plurality of rods.

3. The waveguide structure of claim 1, wherein said two-dimensional lattice formation comprises a square lattice arrangement.

4. The waveguide structure of claim 1, wherein said two-dimensional lattice formation supports quadratic degeneracy at the zone boundary of its band diagram.

5. The waveguide structure of claim 1, wherein said gyromagnetic materials comprise YIG.

6. The waveguide structure of claim 1, wherein said gyromagnetic materials are resonantly enhanced by a metamaterial to provide a strong gyromagnetic response at a frequency far from the ferromagnetic resonance.

7. The waveguide structure of claim 1 further comprising one or more scatterers positioned between said one or more radiation sources.

8. The waveguide structure of claim 1, wherein said one or more confining barriers comprises one or more conducting plate.

9. The waveguide structure of claim 1, wherein said one or more confining barriers comprises one or more photonic crystals.

10. The waveguide structure of claim 1 further comprising a foam structure positioned at the ends of said photonic crystal structure and said one or more confining barriers.

11. The waveguide structure of claim 1, wherein said magneto-optic effects comprise ferromagnetic resonance.

12. The waveguide structure of claim 1, wherein said one-way edge modes exhibit negligible backscattering.

13. A method of forming a waveguide structure comprising:
    providing a photonic crystal structure comprising gyromagnetic materials arranged in a two-dimensional lattice formation that exhibits a plurality of one-way edge modes produced as a result of magneto-optic effects;
    positioning one or more confining barriers around said photonic crystal structure so as to allow said one-way edge modes to propagate through said photonic crystal structure;
    positioning one or more radiation sources in or around said photonic crystal structure so as to couple electromagnetic energy into and out of the waveguide; and
    providing one or more static external magnetic field sources that induce said magneto-optic effects such that said one-way edge modes are allowed to propagate in one direction in said photonic crystal structure.

14. The method of claim 13, wherein said photonic crystal structure comprises a plurality of rods.

15. The method of claim 13, wherein said two-dimensional lattice formation comprises a square lattice arrangement or diagonal lattice arrangement.

16. The method of claim 13, wherein said two-dimensional lattice formation supports quadratic degeneracy at the zone boundary of its band diagram.

17. The method of claim 13, wherein said gyromagnetic materials comprise YIG.

18. The method of claim 13, wherein said gyromagnetic materials are resonantly enhanced by a metamaterial to provide a strong gyromagnetic response at a frequency far from the ferromagnetic resonance.

19. The method of claim 13 further comprising one or more scatterers positioned between said one or more radiation sources.

20. The method of claim 13, wherein said one or more confining barriers comprises one or more conducting plate.

21. The method of claim 13, wherein said one or more confining barriers comprises one or more photonic crystals.

22. The method of claim 13 further comprising a foam structure positioned at the ends of said photonic crystal structure and said one or more confining barriers.

23. The method of claim 13, wherein said magneto-optic effects comprise ferromagnetic resonance.

24. The method of claim 13, wherein said one-way edge modes exhibit negligible backscattering.

* * * * *